Figure 1:
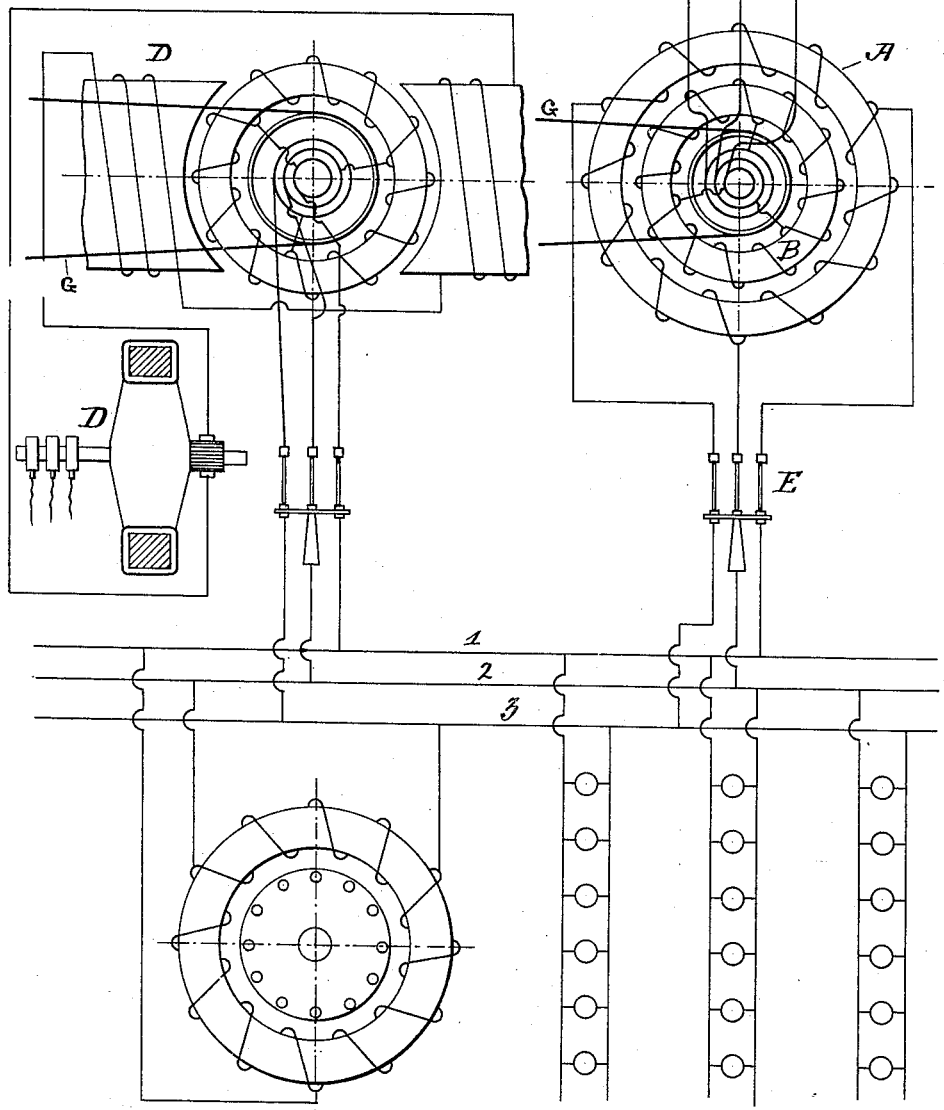

No. 656,806. Patented Aug. 28, 1900.
C. S. BRADLEY.
ALTERNATING CURRENT GENERATOR.
(Application filed June 22, 1896. Renewed May 11, 1900.)

(No Model.) 2 Sheets—Sheet 1.

WITNESSES:
C. L. Belcher
G. H. Stockbridge

INVENTOR
Charles S. Bradley
BY
Robt. S. Read
his ATTORNEY.

No. 656,806. Patented Aug. 28, 1900.
C. S. BRADLEY.
ALTERNATING CURRENT GENERATOR.
(Application filed June 22, 1896. Renewed May 11, 1900.)
(No Model.) 2 Sheets—Sheet 2.

WITNESSES:
E. D. Myers
M. H. Applegate.

INVENTOR
Charles S. Bradley
BY
Robert Kind.
his ATTORNEY.

UNITED STATES PATENT OFFICE.

CHARLES S. BRADLEY, OF AVON, NEW YORK, ASSIGNOR TO THE GENERAL ELECTRIC COMPANY, OF NEW YORK.

ALTERNATING-CURRENT GENERATOR.

SPECIFICATION forming part of Letters Patent No. 656,806, dated August 28, 1900.

Application filed June 22, 1896. Renewed May 11, 1900. Serial No. 16,358. (No model.)

*To all whom it may concern:*

Be it known that I, CHARLES S. BRADLEY, a citizen of the United States, and a resident of Avon, in the county of Livingston, in the State of New York, have invented certain new and useful Improvements in Alternating-Current Generators, of which the following is a specification.

This invention relates to alternating-current generators, and more particularly to that type of generator in which a rotary magnetic field is set up either directly by means of a polyphase exciter or by means of the reaction of a single-phase field with a relatively-movable member of the generator driven by a prime mover above synchronism with the rate of the exciter.

The invention is carried out by providing a rotary-field winding on both elements of the generator, including in circuit with one winding a capacity to render it consonous at the speed at which it is operated and charging the other element with alternating currents to develop a rotary magnetic field. When a machine so constituted is driven at a speed above synchronism with the exciting-currents, it generates in the circuit of the exciter currents of the same period as the latter and of a voltage depending on the speed of the generator. The consonous circuits are inductively excited by cutting the rotary field, and their consonous adjustment permits a large magnetizing-current to flow, developing strong poles, which react on the field and develop an electromotive force therein opposing the electromotive force of the exciter.

The invention therefore comprises an induction-generator of alternating currents provided with a rotary-field winding on one element and a consonous winding on the other.

The invention also comprises an induction-generator provided with rotary-field windings on both elements, one containing sufficient capacity to render it consonous when operated and the other being adapted for inclusion in a polyphase circuit for furnishing magnetizing-current.

It comprises also an induction-generator having a power-driven member magnetized by a rotary field and a generating member in inductive relation thereto.

It involves also other features, which will be hereinafter more fully described and will be definitely pointed out in the claims.

Figure 2:
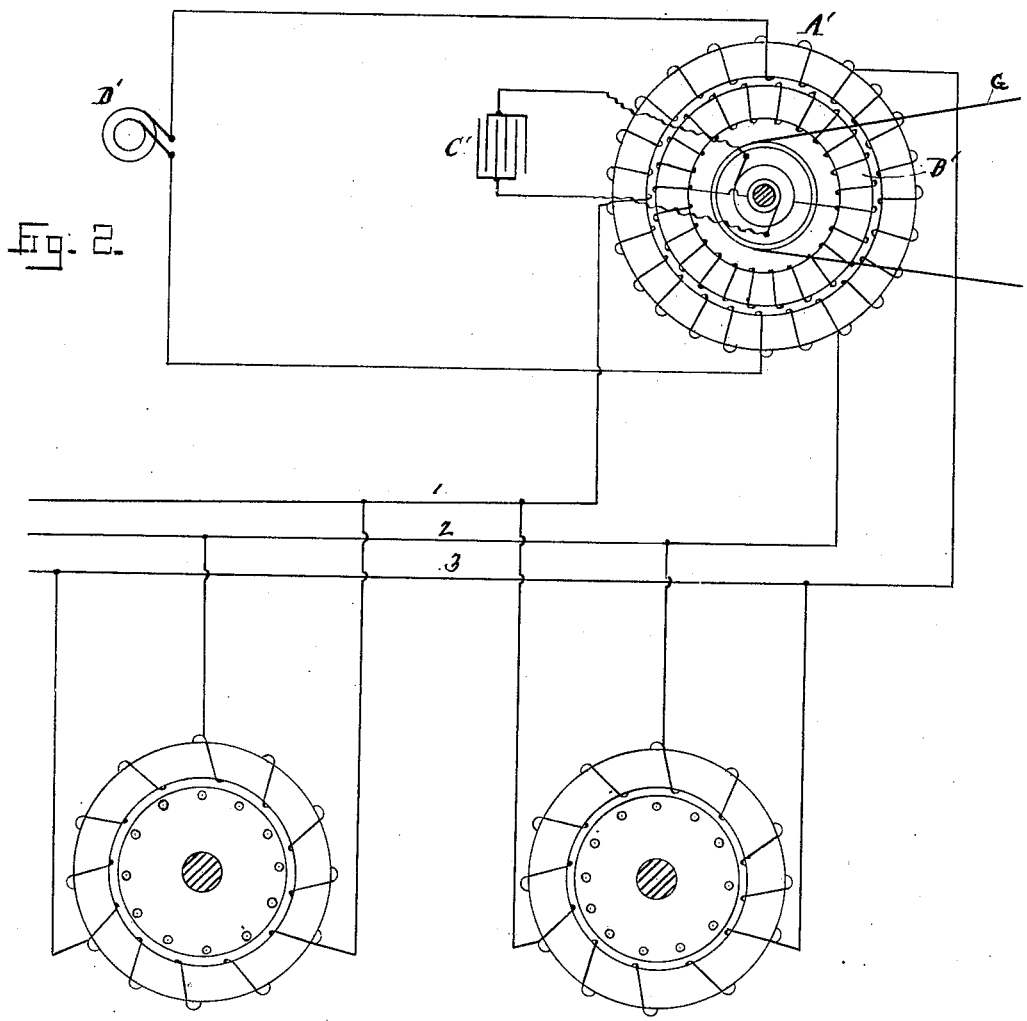

In the accompanying drawings, diagrammatically illustrating the invention, Figure 1 shows an organization having a polyphase exciting-circuit, and Fig. 2 one with a single-phase exciting-circuit.

Referring first to Fig. 1, A represents the core of a rotary magnetic field, and B the core of a coöperating element of the generator. Each is preferably provided with a polyphase winding, shown for convenience as a triphase winding, though of course the number of phases may be greater or less, as desired, and may be the same or different in the two elements. The element which revolves relatively to the magnetic field set up by the exciter is provided with connections including in its circuits condensers $c'$ $c^2$ $c^3$. This element is shown in the drawing as the one which is revolved by the prime mover. It will be evident, however, to those skilled in the art that it is relative motion of the two generator members which determines generation of current and that therefore either may be made the revolving member. The magnetizing-winding is connected at a plurality of points with terminals for inclusion in the circuit of an exciter D.

1 2 3 represent a polyphase distribution-circuit provided with induction-motors, lamps, or other translating devices, as indicated. The exciter D is provided with a direct-charged field or may have its field-magnet a permanent magnet. The exciter-armature may be utilized to furnish the direct current to charge its field, as shown in the detached view, where F is a commutator for sending direct current into the exciter field-magnet, a method well understood in the art. With this organization if the switch E be closed on the exciter or the mains 1 2 3 and the coöperating element B be driven at a higher speed than the speed of the rotary field set up in A by means of a belt G, for example—that is to say, if it be driven above synchronism with the rate of the exciter—currents will be generated in both elements A and B. By "synchronism" will of course be understood a number of turns of the driven member equal to the rate of alternation of the exciter divided by half the number of poles set up by the magnetizing-current. By including condensers $c'$ $c^2$ $c^3$ of such capacity as to render its circuits consonous the lag is taken out of the magnetizing-circuits and the phases of applied and generated electromotive force at the terminals of the generator become almost coincident, so that although operated by independent prime movers two such machines would properly synchronize in a circuit with each other and with their exciter or exciters and might be cut into circuit independently of each other.

I prefer to operate the driven member of the generator at a speed about twenty-five per cent. above synchronism, since in such cases at commercial rates of alternation—say one hundred and forty cycles per second—this would admit of employing reasonably-small condensers and a moderate amount of copper to produce electrical consonance or the approximately-resonant relation between two inductively-related circuits when the secondary is adjusted so that its capacity in microfarads multiplied by its inductance in henries equals twenty-five thousand three hundred divided by the square of the rate of alternation of the primary.

It is not absolutely essential that the exciter deliver polyphase currents or that the consonous winding should be polyphase. Single-phase currents may be employed, as when induction-motors are connected in the distribution-circuit a rotary field will be set up in the armature of the generator and the necessary conditions supplied for generation of current in both windings. Such an organization is shown in Fig. 2, a single-phase exciter $D'$ connecting with the magnetizing-winding $A'$ at two symmetrical points, the consumption-circuit being connected at three points symmetrical with respect to the supply or exciter connections. The consonous secondary circuit may be single phase, as indicated by the single condenser $C'$.

Having thus described my invention, what I claim as new, and desire to secure by Letters Patent, is—

1. An induction-generator comprising a power-driven member magnetized by a rotary field and including a condenser in the circuit, and a generating member in inductive relation to said power-driven member.

2. An induction-generator of alternating currents provided with a rotary-field winding on one element and a consonous winding on the other element.

3. An induction-generator of alternating currents provided with rotary-field windings on both elements, one winding having an inductance capacity product to produce electrical consonance at the desired speed and the other provided with terminals for inclusion in a polyphase exciting-circuit.

4. An induction-generator of alternating currents having a rotary-field winding on one element and terminals for connecting with an exciting-generator, and a polyphase winding on the other element including a condenser in each circuit.

5. In an alternating-current system, the combination with a circuit including induction-motors, of a generator having one member connected with said circuit, an exciter in said circuit and a coöperating member or element including condensers in circuit, and means for driving the generator above synchronism with the rate supplied to the induction-motors.

6. An induction-generator having a magnetizing-circuit on one element supplied by an alternating-current exciter, and a coöperating element containing condensers in circuit.

7. An induction-generator having a magnetizing-circuit on one element supplied by an alternating-current exciter, and a coöperating element containing a condenser in circuit, in combination with a distribution-circuit including one or more induction-motors.

8. An induction-generator having a magnetizing-circuit on one element supplied by an alternating-current exciter, a coöperating element containing a condenser in its circuit, and means for driving the generator above synchronism with the exciter.

In testimony whereof I have hereunto subscribed my name this 29th day of May, A. D. 1896.

CHARLES S. BRADLEY.

Witnesses:
 ROBT. H. READ,
 A. WRIGHT CHAPMAN.